United States Patent [19]

Prischmann

[11] 4,211,260
[45] Jul. 8, 1980

[54] MULTILAYER VESSEL OR TUBE CONSTRUCTION

[75] Inventor: Karl H. Prischmann, Hattingen, Fed. Rep. of Germany

[73] Assignee: Thyssen Industrie AG, Fed. Rep. of Germany

[21] Appl. No.: 8,265

[22] Filed: Feb. 1, 1979

Related U.S. Application Data

[63] Continuation-in-part of Ser. No. 823,501, Aug. 10, 1977, abandoned.

[30] Foreign Application Priority Data

Aug. 14, 1976 [DE] Fed. Rep. of Germany ....... 2636710

[51] Int. Cl.² .............................................. F16L 9/16
[52] U.S. Cl. ..................... 138/143; 138/40; 138/89; 138/157; 137/171; 138/178; 138/DIG. 6
[58] Field of Search ............... 138/40, 42, 89, 103, 138/140, 143, 157, 171, 178, DIG. 6, 149; 220/3, 83, 367; 285/DIG. 25, 13, 14; 156/87; 48/193, 194; 176/87; 428/638

[56] References Cited

U.S. PATENT DOCUMENTS

| | | | |
|---|---|---|---|
| 1,964,100 | 6/1934 | Wang | 138/171 X |
| 2,933,214 | 4/1960 | Douyard | 220/3 |
| 3,128,001 | 4/1964 | Schmitz | 220/3 |
| 3,163,183 | 12/1964 | Sagara | 138/171 X |
| 3,224,619 | 12/1965 | Maurin et al. | 138/143 X |
| 3,256,069 | 6/1966 | Peterson | 220/3 X |
| 3,457,960 | 7/1969 | Uto et al. | 138/143 |
| 3,461,917 | 8/1969 | Uto et al. | 138/143 |
| 3,472,632 | 10/1969 | Hervert et al. | 220/3 X |
| 3,565,275 | 2/1971 | Uto et al. | 220/3 |
| 3,604,587 | 9/1971 | Pechacek | 220/3 |
| 3,779,421 | 12/1973 | Brown et al. | 220/63 |
| 3,861,883 | 1/1975 | Uto et al. | 220/3 X |
| 3,920,518 | 11/1975 | Brissand et al. | 220/83 X |
| 4,130,140 | 12/1978 | Cerny et al. | 138/178 |

*Primary Examiner*—Richard E. Aegerter
*Assistant Examiner*—James E. Bryant, III
*Attorney, Agent, or Firm*—McGlew and Tuttle

[57] ABSTRACT

A multilayer vessel or tube comprises an inner core tube and a plurality of supporting layer tubes around said inner core tube which have degassing bores. A blind layer is provided between the core tube and the innermost supporting layer tube and a plurality of core plugs rest on the core tube and are provided in a number corresponding to the number of degassing bores. The blind layer has an opening therethrough and is longitudinally split into segments and a parting channel is formed between every adjacent two segments. A core plug is positioned in central alignment with the parting channel in an opening of the blind layer. One of the supporting layers is welded only by its upper portion to the supporting layer and the core plug has a bore communicating directly or indirectly with the atmosphere. A degassing pipe is threaded into a threaded bore defined in the core plug and the core plug is provided with grooves which extend transversely along its underside, which rests on the core tube.

4 Claims, 4 Drawing Figures

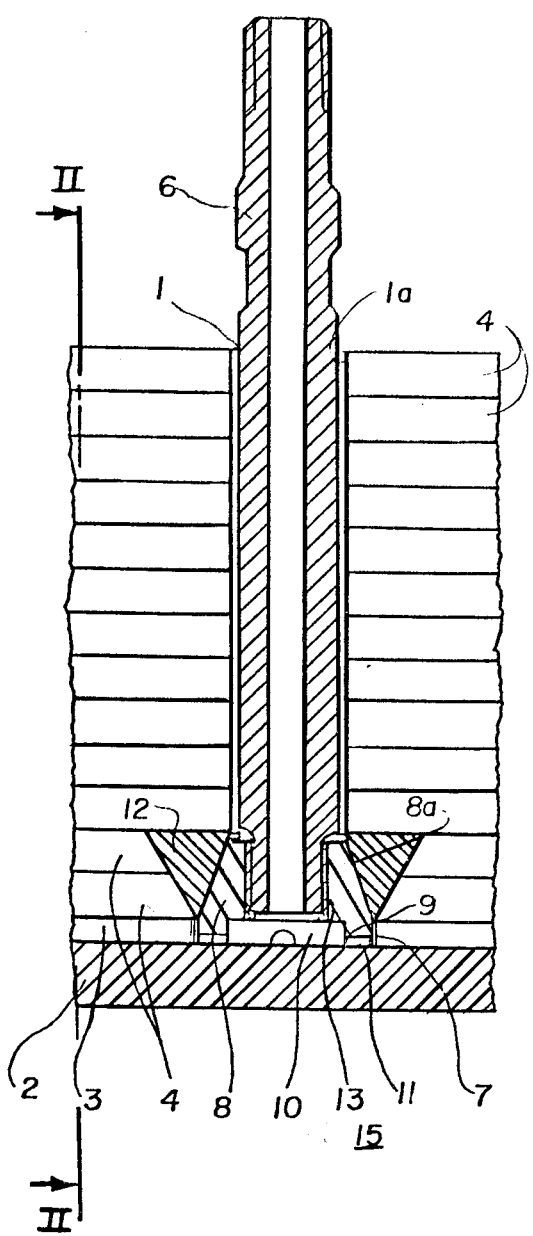
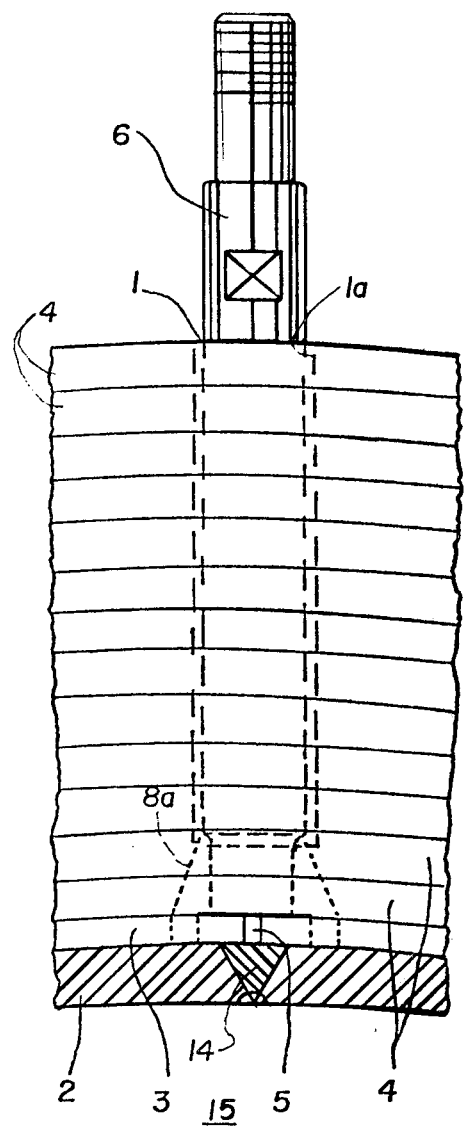
FIG. 1
FIG. 2

MULTILAYER VESSEL OR TUBE CONSTRUCTION

CROSS-REFERENCE TO PRIOR APPLICATION

This is a continuation-in-part application of pending application Ser. No. 823,501 filed on Aug. 10, 1977 for "A MULTILAYER VESSEL OR TUBE CONSTRUCTION" now abandoned.

FIELD AND BACKGROUND OF THE INVENTION

This invention relates to reactor vessels and tubes in general and, in particular, to a new and useful multilayer vessel or cylindrical tube built up of a core tube and a plurality of supporting layers and having degassing bores, in which a blind layer is provided between the core tube and the innermost supporting layer, and core plugs resting on the core tube are provided in a number corresponding to the number of degassing bores.

DESCRIPTION OF THE PRIOR ART

The purpose of degassing openings in multilayer cylindrical tubes is to indicate leakage of the core tube and, in the particular case of operation with diffusing gas, to evacuate the fluid diffused through the core tube, in a harmless manner.

If particularly corrosive operating media are concerned, there is a risk that with a leakage in the core tube, the operating fluid will attack the supporting layers. It, therefore, becomes necessary to protect the gaps between the supporting layers in the region of the degassing openings. One possible solution in this respect is the use of plug weldings. This method, however, is affected with various welding, testing and operational disadvantages.

Examples of prior art structure for degassing bores and the like are found in U.S. Pat. No. 3,461,917 to Uto et al, which shows a degassing bore for vessels containing substances under pressure. Other examples of degassing bores for pressure vessels include U.S. Pat. No. 3,224,619 to Maurin et al., U.S. Pat. No. 3,457,960 to Uto et al, U.S. Pat. No. 3,565,275 also to Uto et al., U.S. Pat. No. 3,604,587 to Pachacek and U.S. Pat. No. 3,861,883 again to Uto et al. An example of a vessel designed for containing corrosive material is found in U.S. Pat. No. 3,779,241 to Brown et al.

Degassing bores are also known which are surrounded by jackets extending from an innermost core tube layer to the exterior of a vessel which involve extensive welding and are costly. With an increase in the required amount of welding comes an increase in the possibility that cracks and imperfections will develop in the welding and surrounding material which would defeat the degassing purpose and, especially where corrosive materials are contained, expose the vessel to the corrosive influence of such materials.

SUMMARY OF THE INVENTION

The present invention is directed to a multilayer vessel or cylindrical tube of the kind mentioned above, in which, at the occurrence of leakage in the core tube, damage to the supporting layers is securely prevented. At the same time, an economical machining of the degassing bores and reliable testing of the welding seams are ensured.

In accordance with the invention, the blind layer is longitudinally split and a parting channel is formed between every two of the adjacent segments thus obtained, and a core plug centrally aligned with the parting channel is disposed in an opening of the blind layer and of at least one of the supporting layers. The plug is welded by its upper portion only to the supporting layer or layers and is provided with a bore communicating directly or indirectly with the atmosphere. A plurality of plugs may be provided along the supporting layer or layers.

In accordance with an advantageous development of the invention, in order to securely evacuate the operational fluid which, because of a leak in the core tube, has penetrated therethrough, each core plug is provided with a threaded bore into which a length of pipe is screwed. On its underside resting on the core tube, the core plug is provided with grooves which preferably extend crosswise.

In case the attack by corrosion of the operating fluid takes place in the area of the welding seams of the core tube, it is advisable to provide the parting channels directly above the longitudinal seams or in the immediate vicinity thereof.

Accordingly, an object of the invention is to provide an improved multilayer vessel or cylindrical tube construction which includes a core tube and a plurality of supporting layer tubes having degassing bores arranged around the core tube, wherein, a blind layer is provided between the core tube and the innermost layer of the supporting tubes and a plurality of core plugs rests on the core tube and they are provided in a number corresponding to the number of degassing bores, the blind layer having an opening therethrough being longitudinally split into segments so as to form a parting channel between every two adjacent segments, and including a core plug in central alignment with the parting channel disposed in an opening of the blind layer and wherein at least one of the supporting layers is welded by its upper portion only to the supporting layer and wherein the core plug has a bore communicating with the atmosphere.

A further object of the invention is to provide a vessel or cylindrical tube which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which a preferred embodiment of the invention is illustrated.

BRIEF DESCRIPTION OF THE DRAWING

In the Drawing:

FIG. 1 is a longitudinal sectional view of the multilayer cylindrical tube or vessel, constructed in accordance with the invention;

FIG. 2 is a section taken on the line II—II of FIG. 1;

DESCRIPTION OF THE PREFERRED EMBODIMENT

Figure 3:
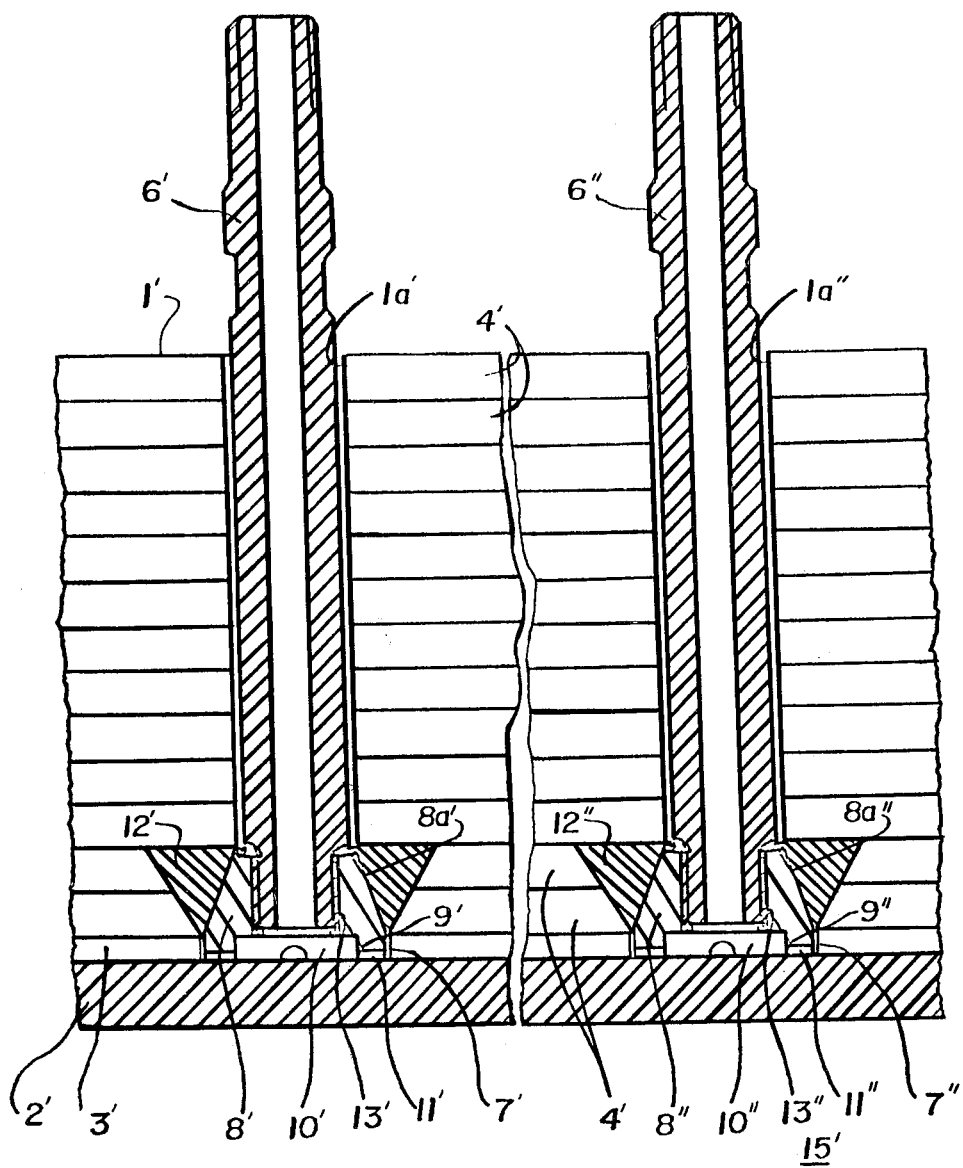
FIG. 3 is a view similar to FIG. 1 of a multilayer vessel having a plurality of degassing devices in accordance with the invention.

Referring to the drawing in particular, the invention embodied therein, comprises, a multilayer tube or vessel 1 which includes a core tube layer 2, a blind layer 3, and a plurality of supporting layers 4 as casing layers. The blind layer 3 is longitudinally split several times, and parting channels 5 are left between the parts or segments thus obtained.

FIG. 1 shows a longitudinal sectional view of only a portion of the cylinder or vessel wall and FIG. 2 shows a section taken along lines II—II of FIG. 1. FIGS. 1 and 2 represent only a very small portion of the vessel wall and the entire vessel can be considered to be a large cylindrical or tank-like structure. The vessel is primarily intended to contain corrosive materials, such as, for example, ammonia carbonate which is from urea synthesis or phosphoric acid which is from ethanol synthesis. The blind layer 3 may be made of suitable materials, such as, for example, carbon steel or 316 L-type stainless steel for urea synthesis or copper for ethanol synthesis.

In the embodiment shown, a parting channel 5 is provided above at least every longitudinal seam or weld of the core tube 2. The channel 5 should be sufficiently large to be capable of securely evacuating any operating fluid leaking through the welding seams of core tube 2. Examples of an operating fluid include corrosives such as hydrogen sulfide and any other fluid which may be dangerous if leaked.

Degassing pipes 6 are disposed centrally of parting channel 5 in the following manner: In blind layer 3 and, in the present embodiment, in two of the adjacent supporting layers 4, an opening 7 is provided which extends through all three layers and into which a core plug 8 of non-corrosive steel is inserted. Core plug 8 is provided on its underside 9, by which it rests against core tube 2, with a circular recess 10 and with grooves 11 extending therefrom radially outwardly. The upper portion 8a of core plug 8 is austenitically welded to the lower few (one to four) supporting layers 4. Prior to placing further layers 4 orver the lower ones, these welding seams may be ground flush and they are carefully treated. In alignment with circular recess 10, core plug 8 is also provided with a threaded through-bore 13, into which the lower end of degassing pipe 6 is tightly screwed.

A plurality of core plugs 8 are provided, and each is provided with a corresponding degassing pipe 6. Degassing pipe 6 is disposed in a degassing bore 1a extending through the support layers 4.

The particular advantage of the invention is that in case of a leak, it is possible to find out whether in addition to core tube 2, the first two supporting layers 4 which are welded to core plug 8 are also corroded through. The indication of such a corrosion is that, upon introducing pressurized gas into degassing pipes 6, the gas escapes through the gap between the degassing pipes and the multilayer wall. Another advantage of the invention is that with the design provided herein, the entire multilayer wall is degassed and the local shrinkage strains which may be observed in plug weldings of the prior art are avoided.

The degassing or leak indication in accordance with the invention can be ensured even in cases where no blind layer is provided between the core tube and the first supporting layer of the multilayer tube.

Thus, a core plug 8 is welded into the bottom few layers 4 as shown by the triangular mass 12 indicating the annular weld between the bottom few layers 4 and the plug 8. The substantial advantages which are realized by the invention include the fact that if corrosive material leaks from the interior 15 of the vessels through the core tube layer 2, through, for example, a defective weld 14 which closes the core tube 2, the leaked material will travel along the channel 5, enter the circular recess 10 and proceed up the tube 6 which is made of a particularly corrosion-resistant material, such as stainless steel, which is of a corrosion-resistance much higher than the upper supporting layers 4.

The provision of the degassing tube 6 thus isolates the leaked material from the degassing bore 1a and from destroying the upper layers 4 by corrosion. Plug 8 is similarly made of corrosion-resistant material. The provision of weld 12 only to the lower support layers 4 economizes on such welding and reduces the chances that defects, such as cracks, will form in the weld and thus reduces the chance that corrosion will leak through such cracks.

Other advantages include the low cost of forming such degassing bores, particularly where large or thick-walled vessels are to be serviced. The reduction of necessary welding also reduces the prevalence of welding stresses which are prevalent where more extensive welding is required.

The invention also provides more easily handled operations than the prior art realizes, since the leaked corrosive materials are precisely channeled.

Figure 4:
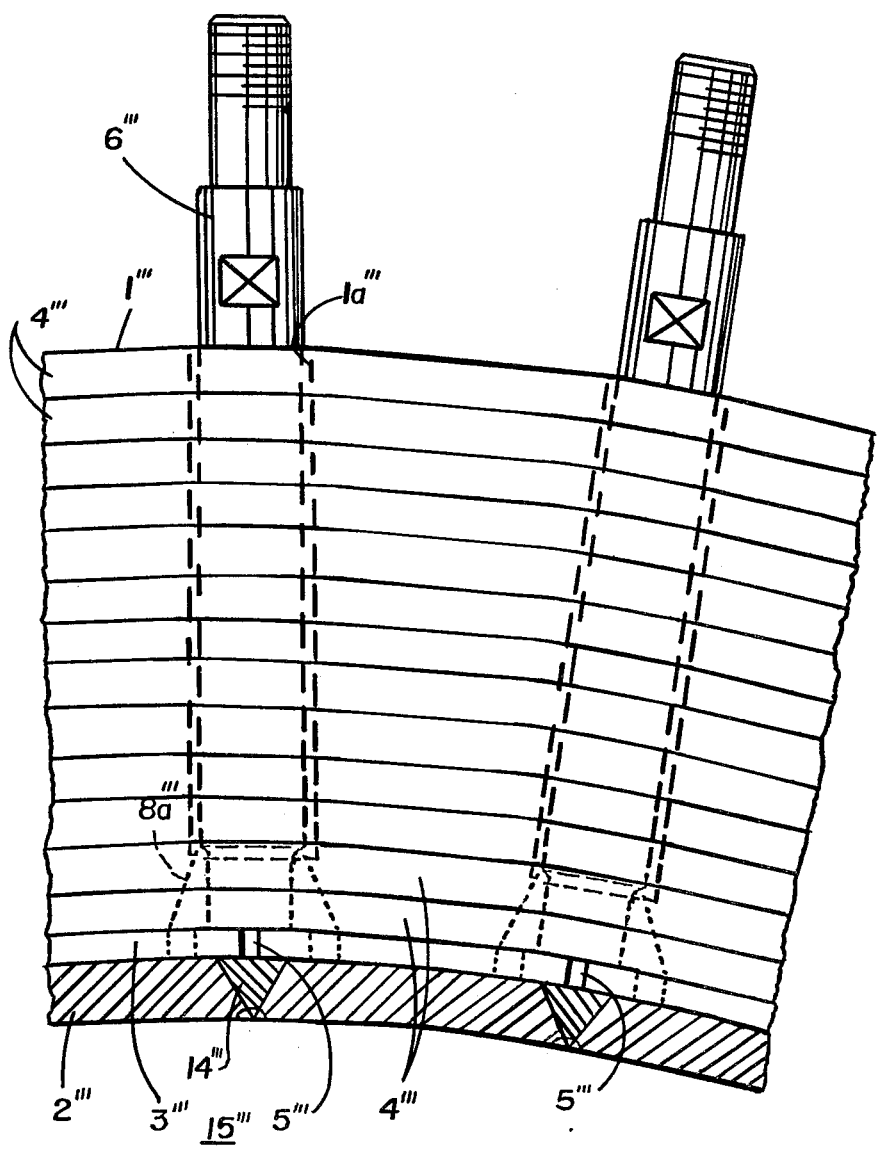
FIG. 4 is a view similar to FIG. 2 of a multilayer cylindrical tube or vessel having a blind layer divided into at least two segments.

In FIG. 3, the same elements shown in FIGS. 1 and 2 are shown with like numerals having primes and double primes thereon. In FIG. 3, a plurality of degassing bores 1a', 1a" are shown with their associated parts in accordance with the invention. In FIG. 4, the invention is shown having a plurality of channels 5''' for dividing the blind layer 3''' into two or more segments. Like features of FIG. 4 are represented with like numerals having triple primes thereon.

While a specific embodiment of the invention has been shown and described in detail to illustrate the application of the principles of the invention, it will be understood that the invention may be embodied otherwise without departing from such principles.

What is claimed is:

1. A multilayer vessel, comprising, an inner core tube and a plurality of supporting layer tubes disposed around and associated with said inner core, each of said supporting layer tubes having degassing bores, a blind layer provided between said core tube and the innermost supporting layer tube, a plurality of core plugs resting on said core tube and provided in a number corresponding to the number of degassing bores, said blind layer having a plurality of openings therethrough provided in a number corresponding to the number of said core plugs, each of said core plugs being disposed in one of said openings of said blind layer and each of said core plugs being welded by its upper portion only to a relatively few of said support layers, each of said core plugs having a threaded bore communicating with the atmosphere, and a degassing pipe threaded into said threaded bore and having a passage defined therethrough, each of said core plugs having an underside resting on said core tube with a plurality of grooves therein.

2. A multilayer vessel, as claimed in claim 1, wherein said blind layer is longitudinally split into segments with a parting channel defined between every adjacent tube of said segments, each of said core plugs disposed in one of said openings of said blind lever being in central alignment with said parting channel.

3. A multilayer vessel, as claimed in claim 1, wherein said blind layer is longitudinally split with a parting channel defined therealong, each of said core plugs disposed in one of said openings of said blind layer being in central alignment with said parting channel.

4. A multilayer vessel, comprising, an inner core tube and a plurality of supporting layer tubes around said inner core tube, each supporting layer tube having degassing bores, a blind layer provided between said core tube and the innermost supporting layer tube, a plurality of core plugs resting on said core tube and provided in a number corresponding to the number of degassing bores, said blind layer having a plurality of openings therethrough provided in a number corresponding to the number of said core plugs, each of said core plugs being disposed in one of said openings of said blind layer and each of said core plugs being welded by its upper portion only to between one and four of said supporting layers, each of said core plugs having a threaded bore communicating with the atmosphere, and a degassing pipe threaded into said threaded bore and having a passage defined therethrough, said core plug having an underside resting on said core tube with a plurality of grooves therein.

* * * * *